(12) United States Patent
Mizoguchi et al.

(10) Patent No.: US 9,229,224 B2
(45) Date of Patent: Jan. 5, 2016

(54) IMAGE DISPLAY APPARATUS AND HEAD-MOUNTED DISPLAY

(71) Applicant: Seiko Epson Corporation, Tokyo (JP)

(72) Inventors: Yasushi Mizoguchi, Suwa (JP); Daisuke Ishida, Fujimi (JP)

(73) Assignee: Seiko Epson Corporation (JP)

( * ) Notice: Subject to any disclaimer, the term of this patent is extended or adjusted under 35 U.S.C. 154(b) by 314 days.

(21) Appl. No.: 13/906,866

(22) Filed: May 31, 2013

(65) Prior Publication Data

US 2013/0321889 A1 Dec. 5, 2013

(30) Foreign Application Priority Data

Jun. 4, 2012 (JP) ................................. 2012-127449

(51) Int. Cl.
*G02B 26/08* (2006.01)
*G02B 26/10* (2006.01)
*G02B 27/01* (2006.01)
*G02B 5/30* (2006.01)

(52) U.S. Cl.
CPC ................ *G02B 26/101* (2013.01); *G02B 5/30* (2013.01); *G02B 26/10* (2013.01); *G02B 27/0101* (2013.01); *G02B 27/0172* (2013.01); *G02B 2027/015* (2013.01)

(58) Field of Classification Search
CPC .. G02B 26/0808; G02B 26/105; G02B 26/12; G02B 26/125

USPC ....................................................... 359/199.3
See application file for complete search history.

(56) References Cited

U.S. PATENT DOCUMENTS

| | | | | |
|---|---|---|---|---|
| 2010/0026961 | A1* | 2/2010 | Oniki | ............................ 359/237 |
| 2011/0157668 | A1 | 6/2011 | Maeda | |
| 2013/0321890 | A1 | 12/2013 | Ishida et al. | |
| 2013/0321891 | A1 | 12/2013 | Ishida et al. | |

FOREIGN PATENT DOCUMENTS

| | | |
|---|---|---|
| JP | 2011-154344 A | 8/2011 |
| JP | 2012-029141 A | 2/2012 |

\* cited by examiner

*Primary Examiner* — Euncha Cherry
(74) *Attorney, Agent, or Firm* — Harness, Dickey & Pierce, P.L.C.

(57) ABSTRACT

An image display apparatus includes laser light sources, a light combining section that combines laser light from the laser light sources, and an optical scanner that deflects drawing laser light from the light combining section for two-dimensional scanning. The optical axes of the laser light outputted from the laser light sources and directed toward the optical scanner are present in the same plane. Further, the optical scanner has a light reflection surface configured to be perpendicular to the plane when the optical scanner is not driven. The optical scanner deflects the drawing laser light reflected off the light reflection surface for two-dimensional scanning by causing the light reflection surface to swing within the plane and in the direction perpendicular to the plane.

22 Claims, 9 Drawing Sheets

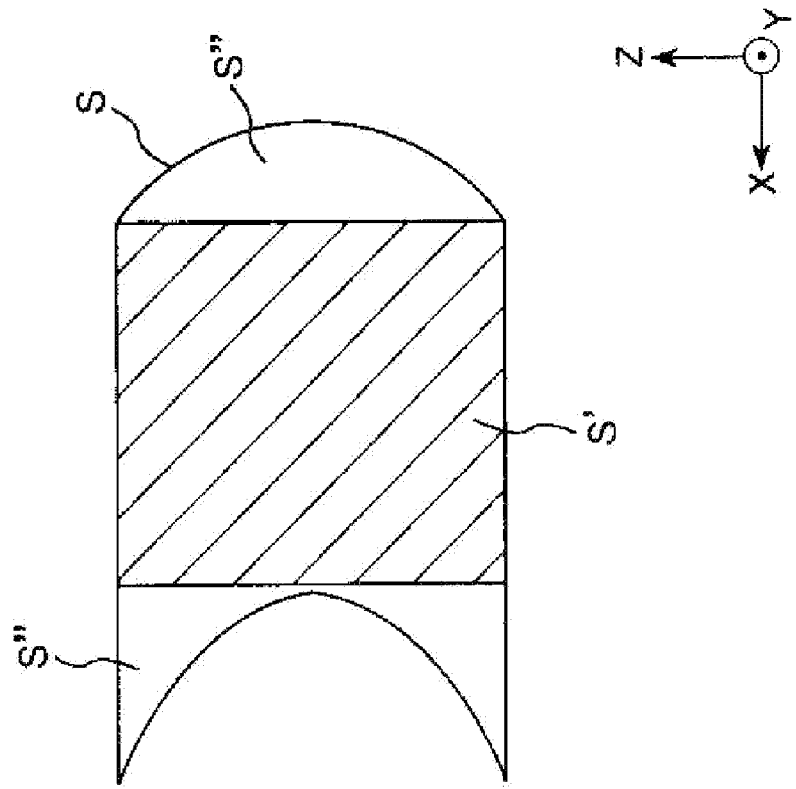
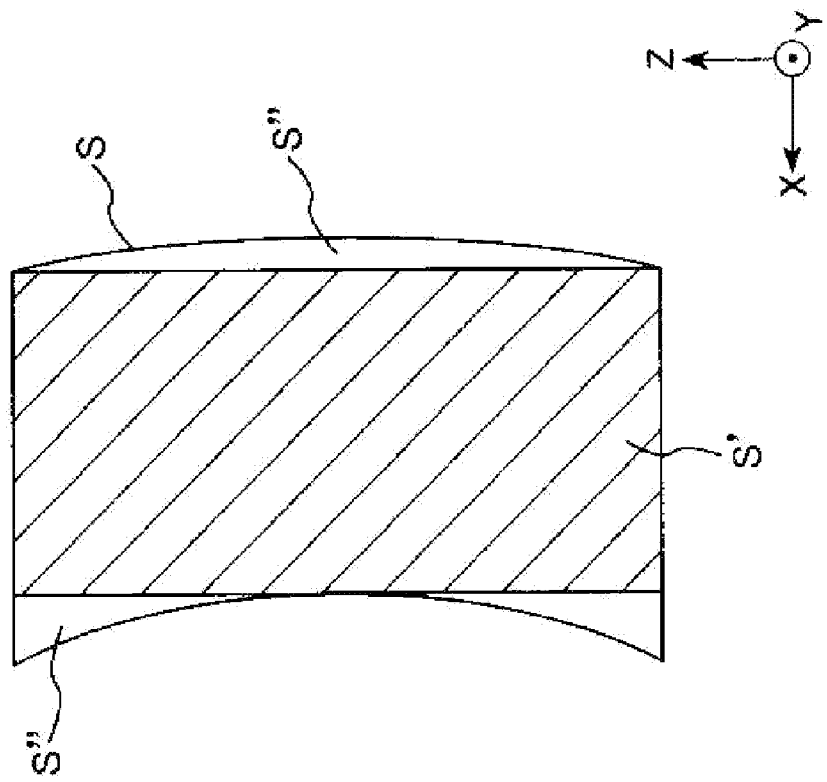

IMAGE DISPLAY APPARATUS AND HEAD-MOUNTED DISPLAY

BACKGROUND

1. Technical Field

The present invention relates to an image display apparatus and a head-mounted display.

2. Related Art

One known image display apparatus for displaying an image on a screen includes a light source and an optical scanner that deflects light from the light source for two-dimensional scanning (see JP-A-2011-154344, for example).

The image display apparatus described in JP-A-2011-154344 includes three semiconductor lasers, a beam supplying section including a coupling lens corresponding to each of the semiconductor lasers, dichroic mirrors, and a collector lens, and a beam deflecting section that deflects a beam outputted from the beam supplying section for two-dimensional scanning. A light reflection surface of a reflection mirror provided in the beam deflecting section is parallel to the optical axis of the beam emitted from each of the semiconductor lasers and disposed in a position shifted from the optical axis in the thickness direction of an enclosure. A flat mirror is therefore provided between the beam supplying section and the beam deflecting section, and the beam outputted from the beam supplying section is reflected off the flat mirror in the thickness direction of the enclosure and is then incident on the reflection mirror of the beam deflecting section.

In the image display apparatus described in JP-A-2011-154344, the thickness (size) of the enclosure can be reduced because the reflection surface of the reflection mirror is perpendicular to the thickness direction of the enclosure, but the number of parts increases because an extra member, such as the flat mirror for reflecting the beam in the thickness direction, is required. Unfortunately, this disadvantageously results in an increase in the number of steps required to assemble the apparatus.

SUMMARY

An object of some aspects of the invention is to provide an image display apparatus that allows reduction not only in the number of parts but also in the size of the apparatus and a head-mounted display including the image display apparatus.

An image display apparatus according to an aspect of the invention includes a plurality of light source sections each of which outputs a light, a light combining section that combines the light from the plurality of light source sections, and an optical scan section that deflects the combined light from the light combining section for two-dimensional scanning around a first axis and a second axis perpendicular to the first axis, the optical axis of the light outputted from each of the plurality of light source sections and directed through the light combining section toward the optical scan section is present in a first plane, the optical scan section includes a base that swings around the first axis and the second axis, a light reflection plate having a light reflection surface that reflects the light from the light combining section, the light reflection surface having an area larger than the area of the base, and a spacer that connects the base and the light reflection plate to each other, the first axis is present in the first plane, the second axis is parallel to a normal to the first plane, and the light reflection surface is configured to be perpendicular to the first plane when the optical scan section is not driven.

The configuration described above allows the combined light from the light combining section to be incident on the optical scan section without reflecting the combined light in a direction that intersects the first plane and hence eliminates the necessity for a flat mirror. Further, in the optical scan section, the mechanism for causing the light reflection surface to swing can be smaller than the area of the light reflection surface, whereby the area of the optical scan section along the direction parallel to the light reflection surface can be reduced. The light reflection surface configured to be perpendicular to the first plane therefore does not increase the size of the image display apparatus in the direction perpendicular to the first plane. That is, an image display apparatus that allows reduction not only in the number of parts but also in size of the apparatus can be provided.

In the image display apparatus according to the aspect of the invention, it is preferable that the light reflection surface is irradiated with the combined light traveling in a direction inclined to a normal to the light reflection surface.

The light deflected by the optical scan section for two-dimensional scanning is therefore incident on an object without interfering with other members in the apparatus. In other words, it is not necessary to provide a flat mirror or any other optical component for changing the optical path of the light deflected by the optical scan section for two-dimensional scanning, whereby the size of the image display apparatus can be reduced.

In the image display apparatus according to the aspect of the invention, it is preferable that the amplitude of the swing motion of the base around the first axis is greater than the amplitude of the swing motion of the base around the second axis.

In this way, an effective drawing region that is contained in a light drawable region and can be used to actually display an image can be increased.

In the image display apparatus according to the aspect of the invention, it is preferable that the optical scan section includes a frame that surrounds the base, a support that supports the frame, a first shaft that connects the base to the frame in such a way that the base is rotatable around the first axis relative to the frame, and a second shaft that connects the frame to the support in such a way that the frame is rotatable around the second axis relative to the support.

The optical scan section described above has a simple configuration, and the size of the optical scan section can be reduced.

In the image display apparatus according to the aspect of the invention, it is preferable that the light reflection plate is set apart (spaced apart) from the first shaft in a thickness direction of the light reflection plate but overlaps with at least part of the first shaft when viewed in the thickness direction.

Since the light reflection plate is set apart from the first shaft in the thickness direction but overlaps with at least part of the first shaft when viewed in the thickness direction, the size of the optical scan section can be reduced.

In the image display apparatus according to the aspect of the invention, it is preferable that the first shaft is disposed in parallel to an in-plane direction in the first plane, and that the base is allowed to resonantly swing around the first axis by resonantly driving a first oscillation system including the light reflection plate, the spacer, the base, and the first shaft.

The base can therefore be allowed to swing around the first axis at a large amplitude with a small amount of energy.

In the image display apparatus according to the aspect of the invention, it is preferable that the width of the frame in the direction of the normal to the first plane is smaller than the width of the frame in the in-plane direction in the first plane.

The thickness of the image display apparatus can therefore be reduced.

In the image display apparatus according to the aspect of the invention, it is preferable that the optical scan section further includes a permanent magnet provided on the frame and a coil that faces the frame and produces a magnetic field that acts on the permanent magnet.

The width of the optical scan section in the in-plane direction of the light reflection surface can therefore be reduced. The thus shaped optical scan section is suitable for the image display apparatus according to the aspect of the invention.

It is preferable that the image display apparatus according to the aspect of the invention further includes a prism that is provided on the optical axis of the combined light from the light combining section, inclines the optical axis of the combined light from the light combining section, and changes the cross-sectional shape of the combined light.

Shaping the cross-sectional shape of the combined light improves image display characteristics.

In the image display apparatus according to the aspect of the invention, it is preferable that the light from each of the light source sections is linearly polarized light that behaves as s-polarized light with respect to a light incident surface of the prism.

In this way, for example, loss of the light produced when the light passes through the prism can be reduced.

In the image display apparatus according to the aspect of the invention, it is preferable that the prism increases the width of the cross-sectional shape of the combined light in the in-plane direction in the first plane.

An elliptical (or oval) cross-sectional shape of the light immediately after it is emitted from each of the light source sections can thus be changed to a substantially circular shape, whereby the image display characteristics can be improved.

In the image display apparatus according to the aspect of the invention, it is preferable that a light exiting surface of the prism is a light collecting lens surface.

In this way, when an image is displayed on an object located in a position in the vicinity of the focal point of the lens surface, better image display characteristics are provided.

In the image display apparatus according to the aspect of the invention, it is preferable that the angle of radiation of the light outputted from each of the plurality of light source sections in the direction of the normal to the first plane is greater than the angle of radiation of the outputted light in the in-plane direction in the first plane.

The contour of the intensity distribution of a laser light emitted from a semiconductor laser, which is typically used as a light source, has a substantially elliptical shape. That is, the angle of radiation of the laser light in the direction of the major axis of the ellipse differs from the angle of radiation of the laser light in the direction of the minor axis of the ellipse. For example, setting the direction of the major axis, where the angle of radiation is larger, to be perpendicular to the first plane allows the prism to be obliquely disposed in the first plane, whereby the size of the apparatus can be reduced.

A head-mounted display according to another aspect of the invention includes a light reflection member that reflects at least part of light incident thereon, and an image display apparatus that irradiates light to the light reflection member, the image display apparatus including a plurality of light source sections each of which outputs a light, a light combining section that combines the light from the plurality of light source sections, and an optical scan section that deflects the combined light from the light combining section for two-dimensional scanning around a first axis and a second axis perpendicular to the first axis, wherein the optical axis of the light outputted from each of the plurality of light source sections and directed through the light combining section toward the optical scan section is present in a first plane, the optical scan section includes a base that swings around the first axis and the second axis, a light reflection plate having a light reflection surface that reflects the light from the light combining section, the light reflection surface having an area larger than the area of the base, and a spacer that connects the base and the light reflection plate to each other, the first axis is present in the first plane, the second axis is parallel to a normal to the first plane, and the light reflection surface is configured to be perpendicular to the first plane when the optical scan section is not driven.

A head-mounted display formed of a reduced number of parts can thus be provided.

BRIEF DESCRIPTION OF THE DRAWINGS

The invention will be described with reference to the accompanying drawings, wherein like numbers reference like elements.

FIGS. 8A and 8B show a difference in a drawable region caused by the disposition of the optical scanner.

DESCRIPTION OF EXEMPLARY EMBODIMENTS

An image display apparatus and a head-mounted display according to preferred embodiments of the invention will be described below with reference to the accompanying drawings.

1. Image Display Apparatus

Figure 1:
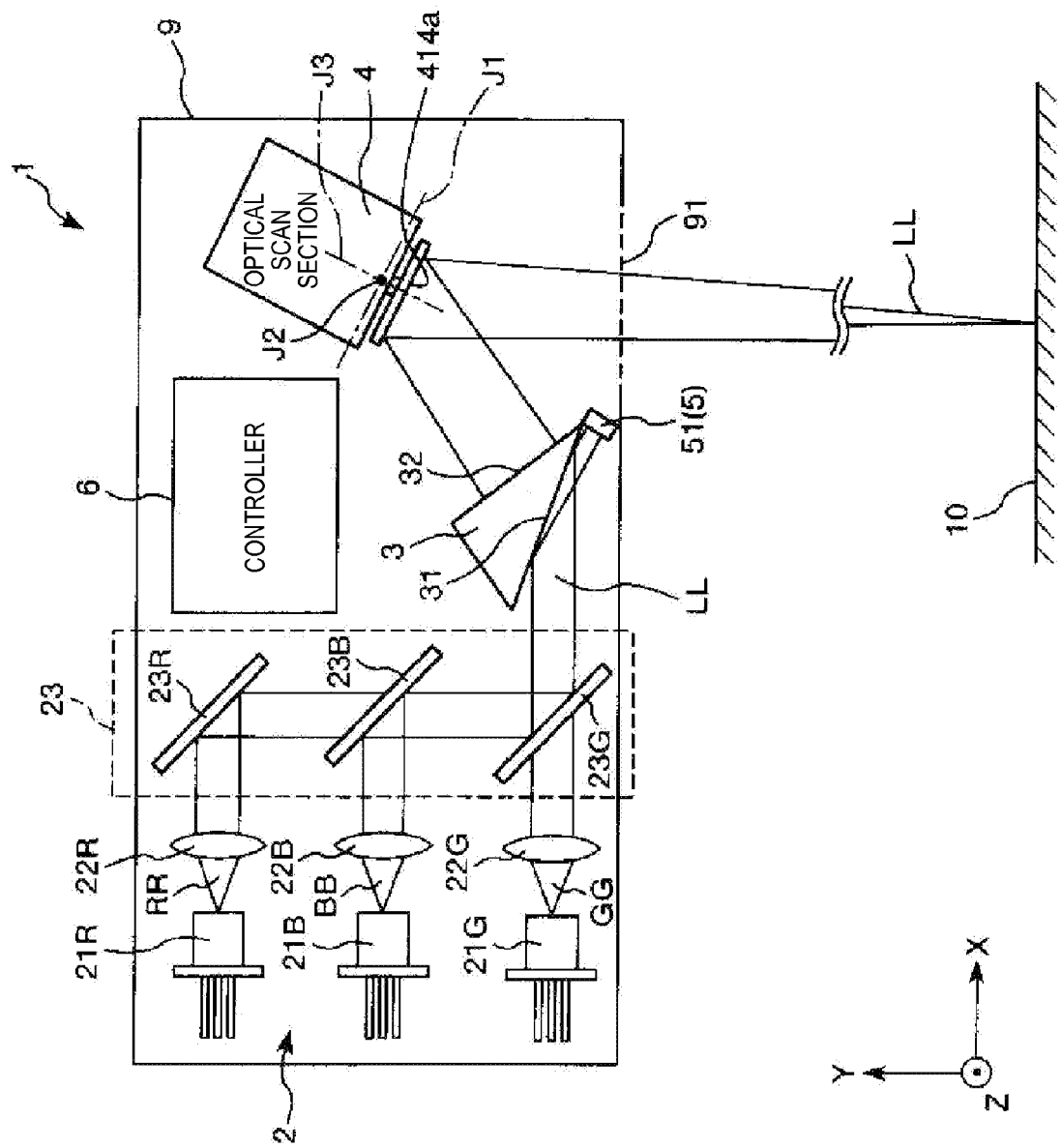
FIG. 1 is a plan view showing an image display apparatus according to a preferred embodiment of the invention.
Figure 2:
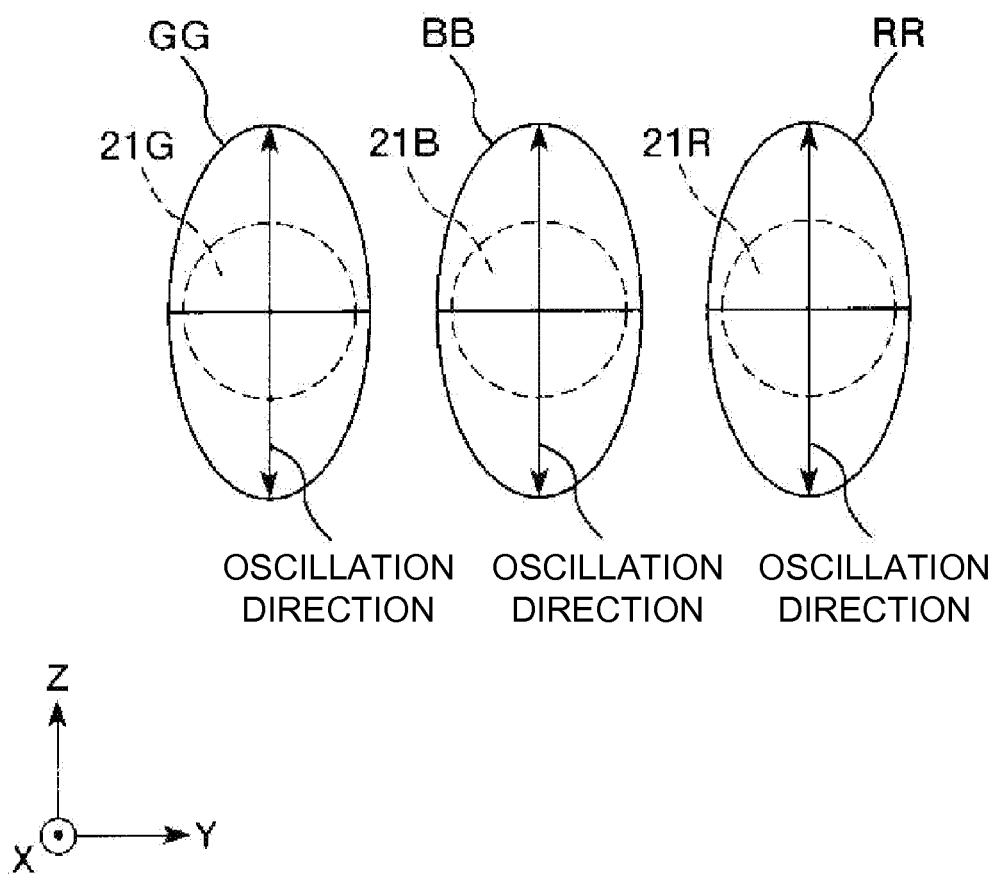
FIG. 2 is a cross-sectional view of a laser light emitted from each laser light source shown in FIG. 1.
Figure 3:
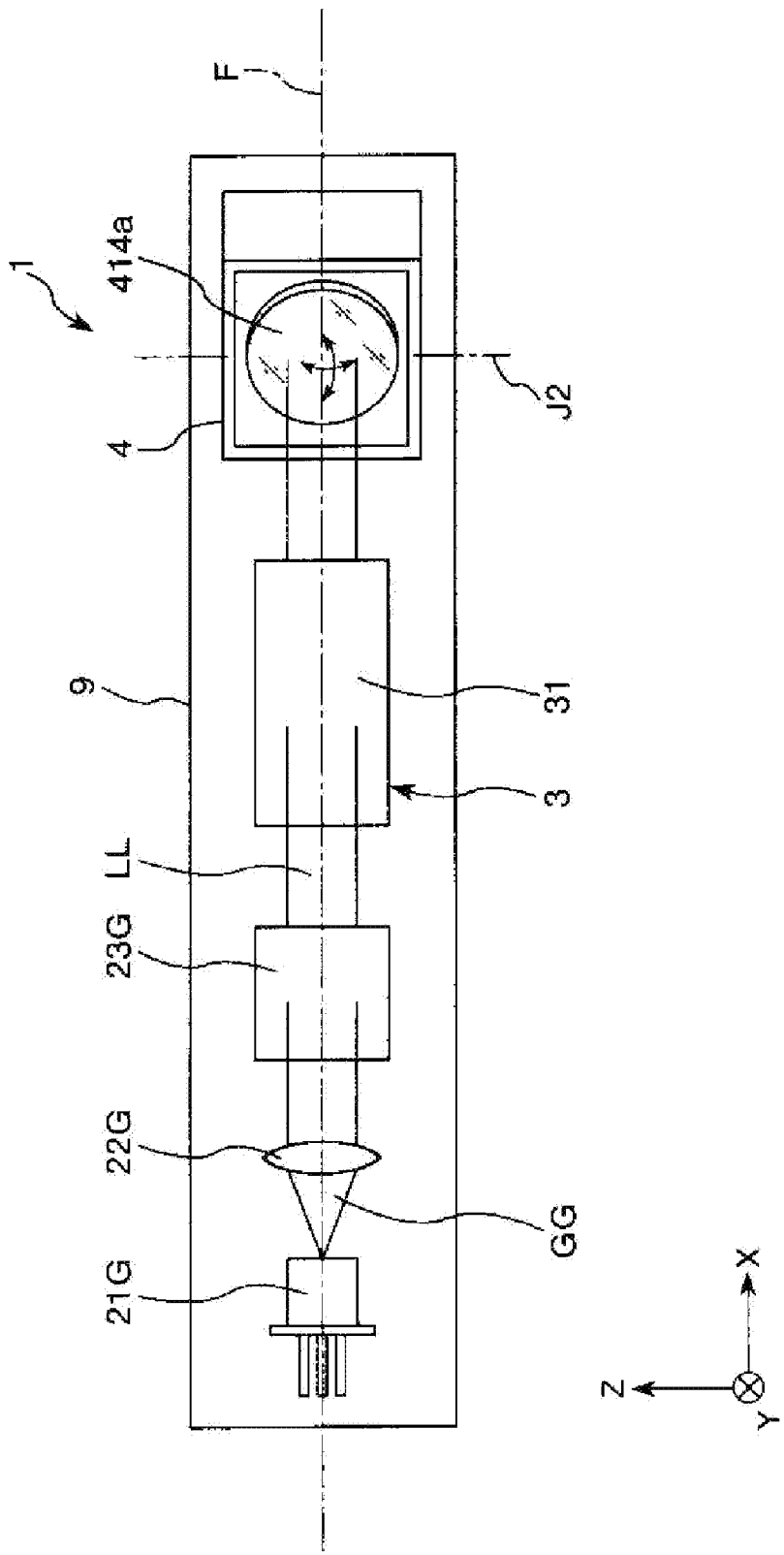
FIG. 3 is a side view of the image display apparatus shown in FIG. 1.
Figure 4:
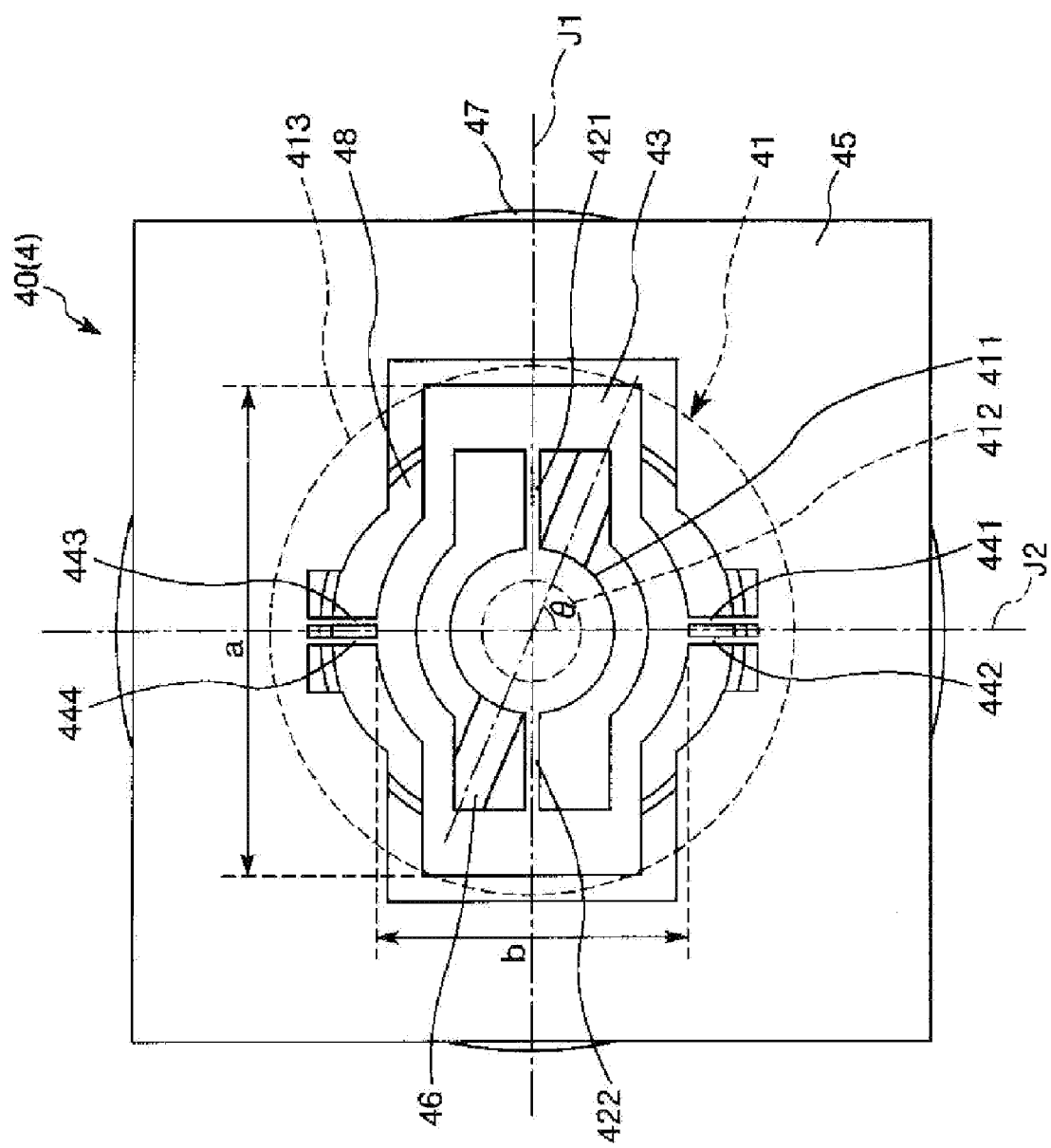
FIG. 4 is a plan view showing an optical scan section (optical scanner) provided in the image display apparatus shown in FIG. 1.
Figure 5:
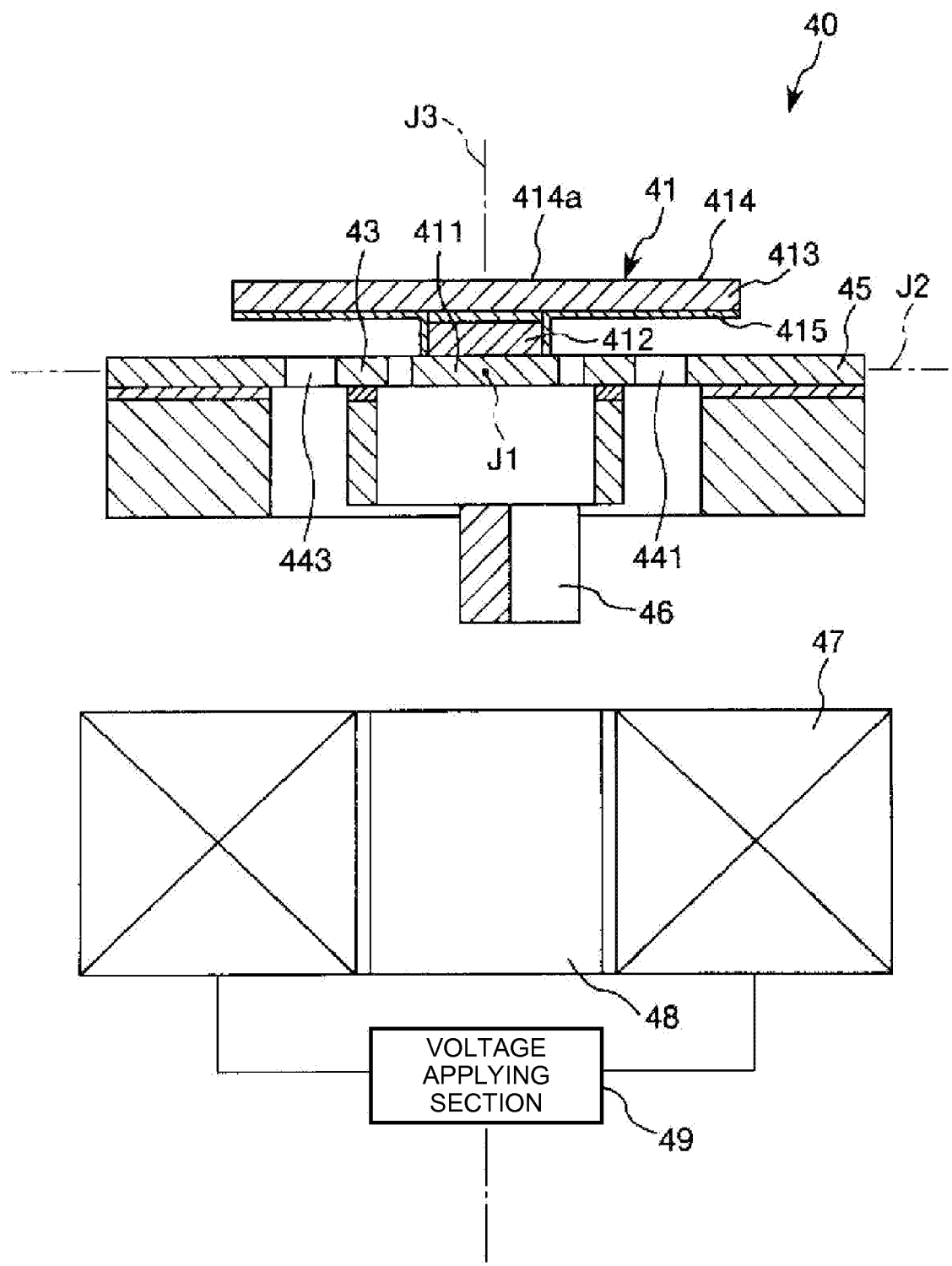
FIG. 5 is a cross-sectional view of the optical scanner shown in FIG. 4.
Figure 6:
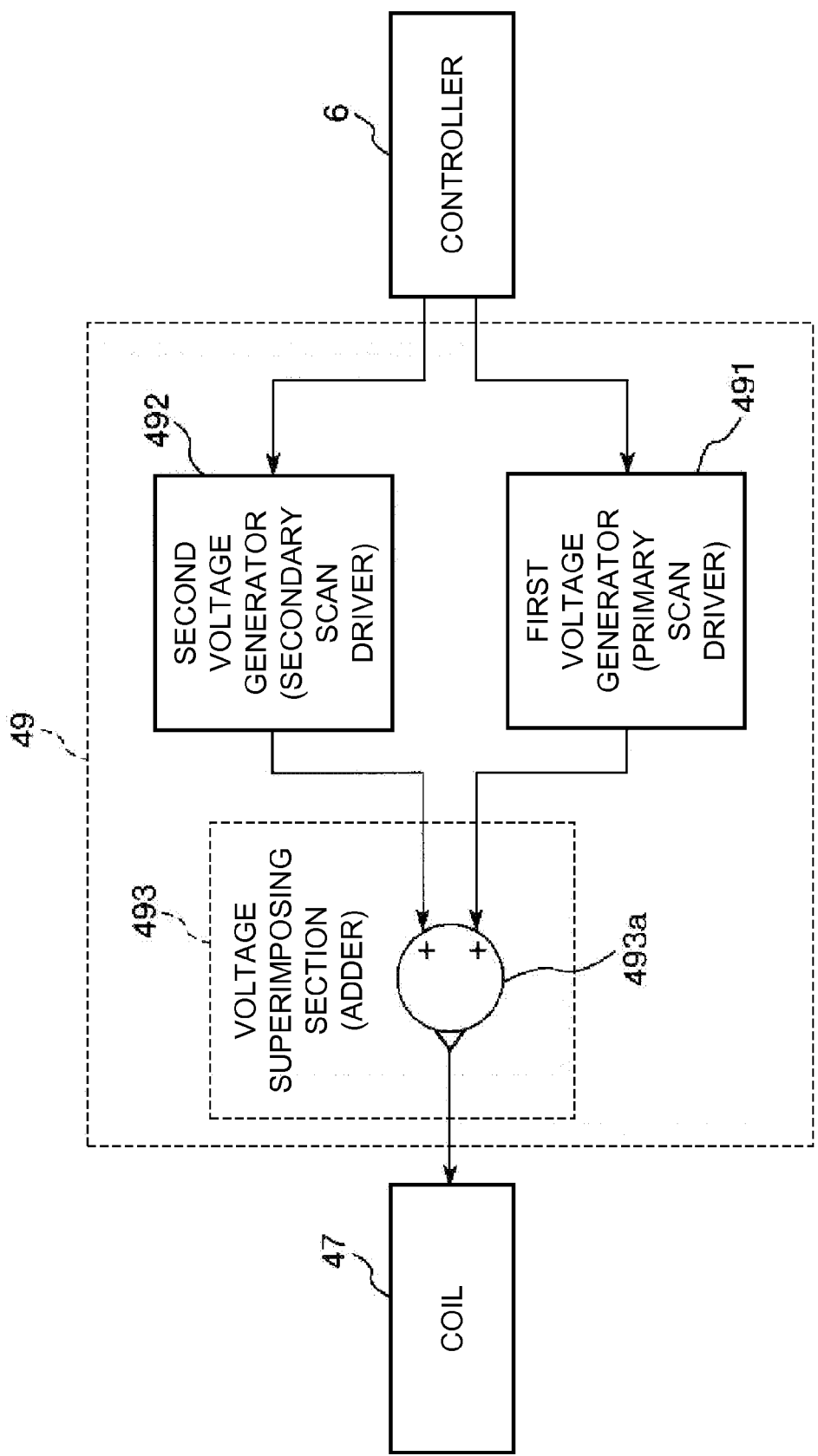
FIG. 6 is a block diagram of a voltage applying section provided in the optical scanner shown in FIG. 4.
Figure 7A:
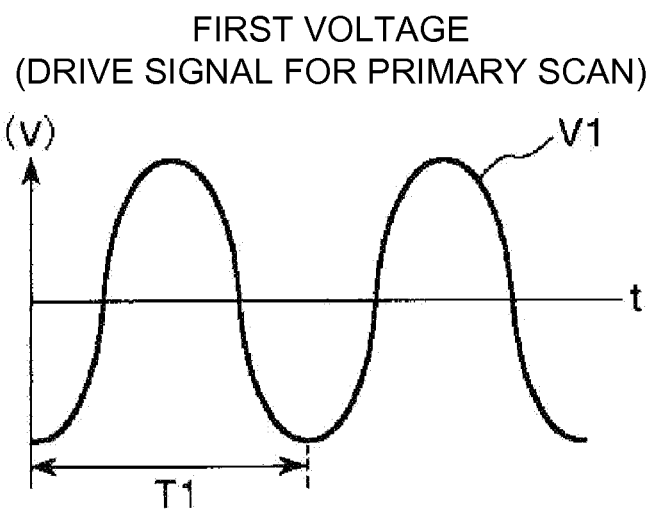
FIGS. 7A and 7B show examples of voltages generated by a first voltage generator and a second voltage generator shown in FIG. 6.
Figure 7B:
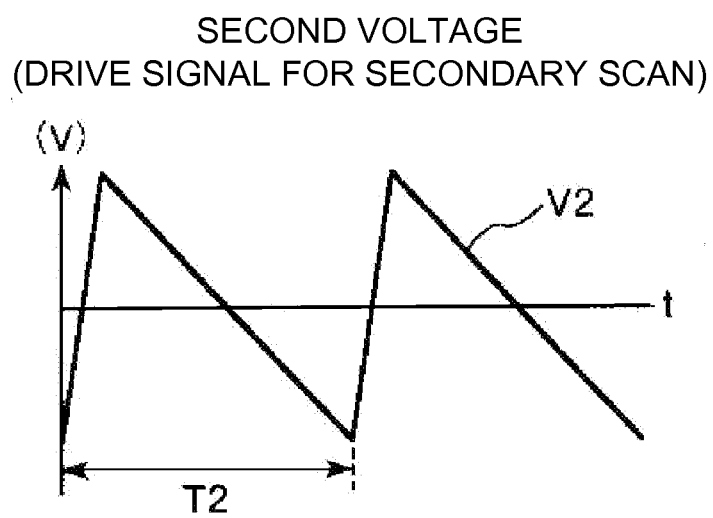

FIG. 1 is a plan view showing an image display apparatus according to a preferred embodiment of the invention. FIG. 2 is a cross-sectional view of a laser light emitted from each laser light source shown in FIG. 1. FIG. 3 is a side view of the image display apparatus shown in FIG. 1. FIG. 4 is a plan view showing an optical scan section (optical scanner) provided in the image display apparatus shown in FIG. 1. FIG. 5 is a cross-sectional view of the optical scanner shown in FIG. 4. FIG. 6 is a block diagram of a voltage applying section provided in the optical scanner shown in FIG. 4. FIGS. 7A and 7B show examples of voltages generated by a first voltage generator and a second voltage generator shown in FIG. 6. FIGS. 8A and 8B show a difference in a drawable region caused by the disposition of the optical scanner. In the following description, the upper side in FIG. 5 is called "upper" and the lower side in FIG. 5 is called "lower" for ease of description. Further, three axes perpendicular to one another are called an X axis, a Y axis, and a Z axis, as shown in FIG. 1.

The image display apparatus 1 shown in FIG. 1 is an apparatus that scans an object 10, such as a screen and a wall surface, with light to display an image.

The image display apparatus 1 includes a drawing light source unit 2, which outputs drawing laser light LL, a prism 3 (optical member), which inclines the optical axis of the drawing laser light LL and deforms the transverse cross-sectional shape of the drawing laser light LL, an optical scan section 4, which deflects the drawing laser light LL having passed through the prism 3 for scanning, a detector 5, which detects the intensity of the drawing laser light LL, and a controller 6, which controls the operation of the drawing light source unit 2 and the optical scan section 4.

The image display apparatus 1 has an enclosure 9, which has a flat shape having relatively large dimensions in the XY plane and a height in the Z-axis direction, and the enclosure 9 accommodates the drawing light source unit 2, the prism 3, the optical scan section 4, and the detector 5 arranged in the XY plane. The enclosure 9 in the present embodiment has a substantially rectangular exterior shape in a plan view in the thickness direction of the enclosure 9. The enclosure 9 has a window 91 formed, for example, of a transparent member (made, for example, of glass or plastic), through which the drawing laser light LL deflected by the optical scan section 4 for scanning exits out of the enclosure 9. The controller 6 may be accommodated in the enclosure 9 as in the present embodiment or may be provided externally to the enclosure 9.

The above components will be sequentially described below.

1-1. Drawing Light Source Unit

The drawing light source unit 2 includes laser light sources (light source sections) 21R, 21G, and 21B for the following colors: red; green; and blue and collimator lenses 22R, 22G, and 22B and dichroic mirrors 23R, 23G, and 23B provided in correspondence with the laser light sources 21R, 21G, and 21B, as shown in FIG. 1.

Each of the laser light sources 21R, 21G, and 21B has a light source and a drive circuit (not shown). The laser light source 21R emits a red laser light RR. The laser light source 21G emits a green laser light GG. The laser light source 21B emits a blue laser light BB. The laser light RR, GG, and BB are emitted in accordance with drive signals transmitted from the controller 6 and are parallelized or substantially parallelized by the collimator lenses 22R, 22G, and 22B, respectively.

In the present embodiment, the laser light sources 21R, 21G, and 21B are arranged in the −Y-axis direction in the order of the laser light source 21R, the laser light source 21B, and the laser light source 21G and disposed in the enclosure 9 in a left end portion thereof in FIG. 1. The laser light sources 21R, 21G, and 21B emit the laser light RR, GG, and BB, respectively, in the +X-axis direction. The thus arranged laser light sources 21R, 21G, and 21B occupy a relatively small space, allowing the size of the image display apparatus 1 (enclosure 9) to be reduced. It is noted that the arrangement of the laser light sources 21R, 21G, and 21B is not limited to the arrangement described above.

Each of the laser light sources 21R, 21G, and 21B can, for example, be an edge-emitting semiconductor laser, a surface-emitting semiconductor laser, or any other suitable semiconductor laser. Using a semiconductor laser allows the size of each of the laser light sources 21R, 21G, and 21B to be reduced.

When each of the laser light sources 21R, 21G, and 21B is formed of a semiconductor laser, the optical intensity distribution of each of the laser light RR, GG, and BB emitted from the laser light sources 21R, 21G, and 21B has in general a contour (called an FFP: far field pattern) having a substantially elliptical shape. It is assumed in the following description that the "cross-sectional shape" of each of the laser light RR, GG, and BB has the same meaning as that of the "contour of the optical intensity distribution" of the corresponding one of the laser light RR, GG, and BB. That is, in this case, each of the laser lights RR, GG, and BB emitted from the laser light sources 21R, 21G, and 21B has a substantially elliptical cross-sectional shape. The cross-sectional shape used herein is the shape of a cross section perpendicular to the optical axis of each of the laser light RR, GG, and BB.

The laser light sources 21R, 21G, and 21B emit the laser light RR, GG, and BB, respectively, each of which has a substantially elliptical (oval) cross-sectional shape, as shown in FIG. 2. Each of the laser light sources 21R, 21G, and 21B is disposed in the enclosure 9 so that the major axis of the ellipse substantially coincides with the Z axis and the minor axis of the ellipse substantially coincides with the Y axis (XY plane). In other words, each of the laser light RR, GG, and BB emitted from the laser light sources 21R, 21G, and 21B has an angle of radiation in the Z-axis direction (the direction of a normal to the XY plane) greater than the angle of radiation in the Y-axis direction (the in-plane direction in the XY plane). In this case, the three laser light sources 21R, 21G, and 21B can be arranged in the Y-axis direction at narrower intervals than, for example, in a case where the angles of radiation are configured in a reversed manner (in a case where the angle of radiation in the Z-axis direction is smaller than the angle of radiation in the Y-axis direction), whereby the dimensions of the enclosure 9 in the XY plane can be reduced. The size of the image display apparatus 1 can therefore be reduced.

Each of the laser lights RR, GG, and BB emitted from the laser light sources 21R, 21G, and 21B is linearly polarized light. Further, the laser light RR, GG, and BB are s-polarized light, which is a light component polarized in a direction perpendicular to the reflection/transmission surfaces (light incident surfaces) of the dichroic mirrors 23R, 23G, and 23B and the light incident surface of the prism 3. That is, each of the laser lights RR, GG, and BB emitted from the laser light sources 21R, 21G, and 21B is polarized light oscillating (polarized) in the Z-axis direction and has an elliptical cross-sectional shape the major axis of which coincides with the oscillating direction. When each of the laser lights RR, GG, and BB is s-polarized light, the amount of loss of the laser light RR, GG, and BB produced when they are incident on the dichroic mirrors 23R, 23G, and 23B and the prism 3, can be reduced.

The dichroic mirror 23R is characterized in that it reflects the laser light RR. The dichroic mirror 23B is characterized in that it reflects the laser light BB and transmits the laser light RR. The dichroic mirror 23G is characterized in that it transmits the laser light GG and reflects the laser light RR and BB. The dichroic mirrors 23R, 23G, and 23B cause the optical axes of the color laser light RR, GG, and BB to coincide or substantially coincide (be combined) with one another so that the single drawing laser light LL is outputted in the +X-axis direction. That is, the dichroic mirrors 23R, 23G, and 23B form a light combining section 23, which combines the laser light RR, GG, and BB with one another.

In the present embodiment, the dichroic mirror 23R, the dichroic mirror 23B, and the dichroic mirror 23G are arranged in this order in the −Y-axis direction in correspondence with the arrangement of the laser light sources 21R, 21B, and 21G. The dichroic mirror 23R is disposed so that it reflects the laser light RR emitted in the +X-axis direction from the laser light source 21R and causes the reflected light to travel in the −Y-axis direction. The dichroic mirror 23B is disposed so that it not only reflects the laser light BB emitted in the +X-axis direction from the laser light source 21B and causes the reflected light to travel in the −Y-axis direction but also transmits the laser light RR reflected off the dichroic mirror 23R in the −Y-axis direction. Further, the dichroic mirror 23G is disposed so that it not only transmits the laser light GG emitted in the +X-axis direction from the laser light source 21G but also reflects the laser light RR and BB reflected in the −Y-axis direction off the dichroic mirrors 23R and 23B and causes the reflected light to travel in the +X-axis direction. The thus configured light combining section 23 outputs the drawing laser light LL in the +X-axis direction.

The dichroic mirrors 23R, 23G, and 23B are preferably disposed so that a laser light of a shorter wavelength is incident on the prism 3 at a greater angle of incidence in consideration of the dispersion resulting from the difference in the refractive index among the wavelengths of the laser light. That is, the dichroic mirrors 23R, 23G, and 23B are disposed with their reflection surfaces slightly shifted from one another around the Z axis so that the following relationship is satisfied: the angle of incidence $\theta_B$ of the blue laser light BB>the angle of incidence $\theta_G$ of the green laser light GG>the angle of incidence $\theta_R$ of the red laser light RR.

1-2. Prism

The prism 3 is an optical member having a first function of inclining the optical axis of the drawing laser light LL, a second function of deforming the shape (cross-sectional shape) of the drawing laser light LL, and a third function of controlling the angle of radiation of the drawing laser light LL (collecting drawing laser light LL, for example). The prism 3 is a substantially colorless, transparent polyhedron made of glass or quartz. The prism 3 is not limited to any specific type as long as it has the functions described above and can, for example, be a triangular prism having a substantially triangular columnar shape. The angled portions of the triangular prism may, for example, be chamfered or otherwise rounded as long as the resultant shape does not affect the functions.

The first function will be described first. The prism 3 receives the drawing laser light LL incident through a light incident surface 31 and outputs the drawing laser light LL through a light exiting surface 32 in a direction inclined to the +X-axis direction toward the +Y-axis direction (a direction toward the inner portion of enclosure 9). That is, the prism 3 inclines the optical axis of the drawing laser light LL around the Z axis (in XY plane). The thus configured prism 3 can direct the drawing laser light LL toward an inner portion of the enclosure 9. The enclosure 9 has a space large enough to place members along extensions of the optical axes of the light emitted from the laser light sources 21R and 21B, and the internal space of the enclosure 9 can be efficiently used by placing the optical scan section 4 in the space. That is, inclining the optical axis of the drawing laser light LL toward an inner portion of the enclosure 9 can reduce the volume of a dead space (unused space where no member is disposed) in the enclosure 9, whereby the size of the image display apparatus 1 can be reduced.

The second function described above will be described next. The prism 3 changes the cross-sectional shape of the drawing laser light LL that is perpendicular to the optical axis thereof from the substantially elliptical shape to a substantially circular shape. Specifically, the prism 3 changes the cross-sectional shape of the drawing laser light LL to a substantially circular shape by increasing the width of the cross-sectional shape of the incident drawing laser light LL in the direction in which the XY plane extends with the width thereof in the Z-axis direction substantially unchanged. In other words, the prism 3 changes the cross-sectional shape of the drawing laser light LL in such a way that the length of the minor axis of the elliptical cross-sectional shape is increased to a point where the ratio between the minor axis and the major axis (aspect ratio) is substantially one. When the cross-sectional shape of the drawing laser light LL becomes a substantially circular shape as described above, the image display apparatus 1 can provide excellent image display characteristics. Further, when the cross-sectional shape of the drawing laser light LL before it is incident on the prism 3 has a substantially elliptical shape the major axis of which extends in the Z-axis direction as described above, the prism 3 only needs to be angularly shifted in the XY plane, whereby the prism 3 can be disposed so that the length of the enclosure 9 in the thickness direction (Z-axis direction) corresponding to the space where the prism 3 occupies is minimized. As a result, the size (thickness) of the image display apparatus 1 can be reduced.

The third function described above will be described next. The light exiting surface 32 of the prism 3 is formed of a curved convex surface (lens surface) and hence functions as a collector lens that collects (focuses) the drawing laser light LL incident in the form of parallelized light on the prism 3. Focusing the drawing laser light LL as described above can increase the sharpness of an image displayed on the object 10 located in a position in the vicinity of the focal point (form an image having higher resolution). Further, the light exiting surface 32 having a function of a collector lens eliminates the necessity of separately providing a collector lens in addition to the prism 3, whereby the number of parts can be reduced and the size of the image display apparatus 1 can be reduced. The light exiting surface 32 of the prism 3 is not limited to a convex surface (collector lens) as long as the light exiting surface 32 can control the angle of radiation of the light that exits through the light exiting surface 32 and can, for example, be a concave surface (a lens that causes light to diverge).

The image display apparatus 1, which uses the prism 3 as the optical member, does not necessarily use a prism but may use an optical member capable of providing the same functions as those provided by the prism 3 described above.

The drawing light source unit 2 and the prism 3 have been described in detail. In the image display apparatus 1, the optical axes of the laser light RR, GG, and BB (drawing laser light LL) are present in the same XY plane (first plane F), as shown in FIG. 3. That is, the following actions are made in the plane F: The laser light sources 21R, 21G, and 21B emit the laser light RR, GG, and BB; the light combining section 23 combines the laser light RR, GG, and BB and outputs the resultant drawing laser light LL; and the prism 3 inclines the optical axis of the drawing laser light LL in the XY plane.

1-3. Optical Scan Section

The optical scan section 4 has a function of deflecting the drawing laser light LL having passed through the prism 3 for two-dimensional scanning. The optical scan section 4 is not limited to a specific type and can be any device capable of deflecting the drawing laser light LL for two-dimensional scanning. For example, an optical scanner 40 having the following configuration can be used.

The optical scanner 40 includes a movable portion 41, a pair of shafts 421 and 422 (first shafts), a frame 43, two pairs of shafts 441, 442, 443, and 444 (second shafts), a support 45, a permanent magnet 46, a coil 47, a magnet core 48, and a voltage applying section 49, as shown in FIGS. 4 and 5.

Among the components described above, the movable portion 41 and the pair of shafts 421 and 422 form a first oscillation system that swings (makes reciprocating motion) around a first axis J1 by using the shafts 421 and 422 as axes. Further, the movable portion 41, the pair of shafts 421 and 422, the frame 43, the two pairs of shafts 441, 442, 443, and 444, and the permanent magnet 46 form a second oscillation system that swings (makes reciprocating motion) around a second axis J2. The permanent magnet 46, the coil 47, and the voltage applying section 49 form a driver that drives the first and second oscillation systems described above.

The components of the optical scanner 40 will be sequentially described below in detail.

The movable portion 41 includes abase 411 and a light reflection plate 413 fixed to the base 411 via a spacer 412, as shown in FIGS. 4 and 5. A light reflection portion 414, which reflects light, is provided on the upper surface (one surface) of the light reflection plate 413. The surface of the light reflection portion 414 forms a light reflection surface 414a, which reflects the drawing laser light LL. The movable portion 41 swings around the first axis J1 and the second axis J2, as described above. That is, it can be said that the base 411, the spacer 412, the light reflection plate 413, and the light reflection surface 414a, which form the movable portion 41, also swing around the first axis J1 and the second axis J2.

The light reflection plate 413 is disposed so that it is set apart from the base 411 and the shafts 421 and 422 via the spacer 412 in the thickness direction of the light reflection plate 413 but overlaps with the shafts 421 and 422 when viewed in the thickness direction (hereinafter also referred to as a "plan view").

The configuration described above allows the area of the plate surface of the light reflection plate 413 to be increased while the distance between the shaft 421 and the shaft 422 to be shortened. Further, since the distance between the shaft 421 and the shaft 422 can be shortened, the size of the frame 43 can be reduced. Moreover, since the size of the frame 43 can be reduced, the distance between the shafts 441, 442 and the shafts 443, 444 can be shortened. As a result, the size of the optical scanner 40 can be reduced even with the area of the plate surface of the light reflection plate 413 increased. That is, the light reflection plate 413 can be enlarged so that the resolution can be increased, whereas the size of the optical scanner 40 is reduced.

The light reflection plate 413 is further formed so that it covers the entire shafts 421 and 422 in the plan view. In other words, the shafts 421 and 422 are located inside the outer circumference of the light reflection plate 413 in the plan view. The area of the plate surface of the light reflection plate 413 is thus increased, resulting in an increase in the area of the light reflection portion 414. The configuration further prevents unwanted light (light that has not been incident on light reflection plate 413, for example) from being reflected off the shafts 421 and 422 to form stray light.

The light reflection plate 413 is further formed so that it covers the entire frame 43 in the plan view. In other words, the frame 43 is located inside the outer circumference of the light reflection plate 413 in the plan view. The area of the plate surface of the light reflection plate 413 is thus increased, resulting in an increase in the area of the light reflection portion 414. The configuration further prevents the unwanted light from being reflected off the frame 43 to form stray light.

Further, the light reflection plate 413 is formed so that it covers the entire shafts 441, 442, 443, and 444 in the plan view. The area of the plate surface of the light reflection plate 413 is thus increased, resulting in an increase in the area of the light reflection portion 414. The configuration further prevents the unwanted light from being reflected off the shafts 441, 442, 443, and 444 to form stray light.

In the present embodiment, the light reflection plate 413 has a circular shape in the plan view. The light reflection plate 413 does not necessarily have a circular shape and can, for example, have an elliptical shape or a rectangular or any other polygonal shape in the plan view.

The thus shaped light reflection plate 413 has a hard layer 415 provided on the lower surface thereof (the other surface, the surface of the light reflection plate 413 that faces the base 411).

The hard layer 415 is made of a material harder than the material of which the body of the light reflection plate 413 is made, whereby the rigidity of the light reflection plate 413 can be increased. The thus increased rigidity prevents the light reflection plate 413 from being bent or suppresses the amount of bending when the light reflection plate 413 swings. The thickness of the light reflection plate 413 can also be reduced, whereby the moment of inertia of the light reflection plate 413 around the first and second axes J1, J2 can be reduced when the light reflection plate 413 swings therearound.

The material of which the hard layer 415 is made is not limited to a specific one and can be any material harder than the material of which the body of the light reflection plate 413 is made, for example, diamond, quartz, sapphire, lithium tantalate, potassium niobate, or a carbon nitride film. It is particularly preferable to use diamond. The hard layer 415 is provided as necessary and can be omitted.

The lower surface of the light reflection plate 413 is fixed to the base 411 via the spacer 412. The light reflection plate 413 can therefore swing around the first axis J1 without the lower surface of the light reflection plate 413 coming into contact with the shafts 421, 422, the frame 43, or the shafts 441, 442, 443, 444.

Further, the base 411 is located inside the outer circumference of the light reflection plate 413 in the plan view. Moreover, the area of the base 411 in the plan view is preferably minimized to the extent that the base 411 can support the light reflection plate 413 via the spacer 412. In this case, the distance between the shaft 421 and the shaft 422 can be reduced, while the area of the plate surface of the light reflection plate 413 is increased.

The frame 43, which has a frame-like shape, is disposed so that it surrounds the base 411 of the movable portion 41 described above. In other words, the base 411 of the movable portion 41 is disposed inside the frame 43, which has a frame-like shape. The frame 43 is supported by the support 45 via the shafts 441, 442, 443, and 444. The base 411 of the movable portion 41 is supported by the frame 43 via the shafts 421 and 422.

The length of the frame 43 in the direction along the first axis J1 is longer than the length thereof in the direction along the second axis J2. That is, a>b is satisfied, where "a" represents the length of the frame 43 in the direction along the first axis J1, and "b" represents the length of the frame 43 in the direction along the second axis J2. The length of the optical scanner 40 in the direction along the second axis J2 can therefore be reduced, while the length necessary for the shafts 421 and 422 is ensured. Since the optical scanner 40 is disposed in the enclosure 9 so that the second axis J2 is parallel to the Z axis as described later, the thickness of the enclosure 9 (length in Z-axis direction) can be reduced when the relationship a>b is satisfied as described above.

Further, the frame 43 has a shape that follows the exterior shape of a structure formed of the base 411 of the movable portion 41 and the pair of shafts 421 and 422 in the plan view. The thus shaped frame 43 can be compact while allowing the first oscillation system formed of the movable portion 41 and the pair of shafts 421 and 422 to oscillate, that is, the movable portion 41 to swing around the first axis J1. The shape of the frame 43 is not limited to the illustrated shape and can be any frame-like shape.

Each of the shafts 421 and 422 and the shafts 441, 442, 443, and 444 is elastically deformable. The shafts 421 and 422 connect the movable portion 41 to the frame 43 in such a way that the movable portion 41 is rotatable (e.g., pivotable) around the first axis J1. Further, the shafts 441, 442, 443, and 444 connect the frame 43 to the support 45 in such a way that the frame 43 is rotatable around the second axis J2, which is perpendicular to the first axis J1.

The shafts 421 and 422 are disposed on opposite sides of the base 411 of the movable portion 41. Further, each of the shafts 421 and 422 has an elongated shape extending in the direction along the first axis J1. Each of the shafts 421 and 422 has one end connected to the base 411 and the other end connected to the frame 43. Each of the shafts 421 and 422 is further disposed so that the central axis thereof coincides with the first axis J1. The thus configured shafts 421 and 422 are torsionally deformed when the movable portion 41 swings around the first axis J1.

The shafts 441, 442 and the shafts 443, 444 are disposed on opposite sides to each other via the frame 43. Each of the shafts 441, 442, 443, and 444 has an elongated shape extending in the direction along the second axis J2. Further, each of the shafts 441, 442, 443, and 444 has one end connected to the frame 43 and the other end connected to the support 45. Further, the shafts 441 and 442 are disposed on opposite sides to each other via the second axis J2. Similarly, the shafts 443 and 444 are disposed on opposite sides to each other via the second axis J2. The shafts 441, 442, 443, and 444 are configured so that the shafts 441 and 442 as a whole and the shafts 443 and 444 as a whole are torsionally deformed when the frame 43 swings around the second axis J2.

As described above, the movable portion 41 rotatable around the first axis J1 and the frame 43 rotatable around the second axis J2 allow the movable portion 41 (that is, light reflection plate 43) to swing around the two axes perpendicular to each other, the first and second axes J1, J2.

The shapes of the shafts 421 and 422 and the shafts 441, 442, 443, and 444 are not limited to those described above, and each of them may, for example, have a bent or curved portion or a branch in at least one position along the shaft.

The base 411, the shafts 421 and 422, the frame 43, the shafts 441, 442, 443, and 444, and the support 45 described above are formed integrally with one another.

In the present embodiment, the base 411, the shafts 421 and 422, the frame 43, the shafts 441, 442, 443, and 444, and the support 45 are formed by etching an SOI substrate formed of a first Si layer (device layer), an $SiO_2$ layer (box layer), and a second Si layer (handle layer) stacked in this order. The configuration described above provides the first and second oscillation systems with excellent oscillation characteristics. Further, forming the base 411, the shafts 421 and 422, the frame 43, the shafts 441, 442, 443, and 444, and the support 45 by using the SOI substrate, which allows etching-based micro-processing, not only provides excellent precision in their dimensions but also reduces the size of the optical scanner 40.

The first Si layer of the SOI substrate forms the base 411, the shafts 421, and 422, and the shafts 441, 442, 443, and 444. The shafts 421 and 422 and the shafts 441, 442, 443, and 444 therefore have excellent elasticity. Further, the base 411 will not come into contact with the frame 43 when the base 411 pivots around the first axis J1.

Each of the frame 43 and the support 45 is formed of the SOI substrate or the stacked member formed of the first Si layer, the $SiO_2$ layer, and the second Si layer, whereby the frame 43 and the support 45 have excellent rigidity. Further, the $SiO_2$ layer and the second Si layer of the frame 43 not only function as a rib that increases the rigidity of the frame 43 but also have a function of preventing the movable portion 41 from coming into contact with the permanent magnet 46.

The upper surface of each of the shafts 421 and 422, the shafts 441, 442, 443, and 444, the frame 43, and the support 45, which are located outside the light reflection plate 413 in the plan view, preferably undergoes antireflection processing, which prevents unwanted light incident on portions other than the light reflection plate 413 from forming stray light. The antireflection processing is not limited to a specific process and can, for example, be formation of an antireflection film (dielectric multilayer film), surface roughing, and surface blackening.

The materials of which the base 411, the shafts 421 and 422, and the shafts 441, 442, 443, and 444 are made and the method for forming these components described above are presented by way of example and are not necessarily used in the invention.

Further, in the present embodiment, the spacer 412 and the light reflection plate 413 are also formed by etching the SOI substrate. The spacer 412 is formed of a stacked member of the $SiO_2$ layer and the second Si layer of the SOI substrate. The light reflection plate 413 is formed of the first Si layer of the SOI substrate. The spacer 412 and the light reflection plate 413 bonded to each other can thus be manufactured in a simple, highly precise manner by forming the spacer 412 and the light reflection plate 413 based on the SOI substrate as described above.

The spacer 412 is bonded to the base 411 with an adhesive, a wax material, or any other suitable bonding material (not shown).

The permanent magnet 46 is bonded to the lower surface of the frame 43 described above. A method for bonding the permanent magnet 46 to the frame 43 is not limited to a specific one and can be, for example, a bonding method using an adhesive. The permanent magnet 46 is magnetized in a direction inclined to the first and second axes J1, J2 in the plan view.

In the present embodiment, the permanent magnet 46 has an elongated shape (rod-like shape) extending in a direction inclined to the first and second axes J1, J2. The permanent magnet 46 is magnetized in the elongated direction. That is, the permanent magnet 46 is magnetized so that one end thereof forms an S pole and the other end thereof forms an N pole. Further, the permanent magnet 46 is disposed so that it is symmetrical with respect to the intersection of the first axis J1 and the second axis J2 in the plan view.

The inclination angle θ of the direction in which the permanent magnet 46 is magnetized (direction in which permanent magnet 46 extends) with respect to the second axis J2 is not limited to a specific value but is preferably greater than or equal to 30° but smaller than or equal to 60°, more preferably greater than or equal to 45° but smaller than or equal to 60°, still more preferably 45°. The thus disposed permanent magnet 46 allows the movable portion 41 to swing around the second axis J2 in a smooth, reliable manner.

The permanent magnet 46 can preferably be, for example, a neodymium magnet, a ferrite magnet, a samarium cobalt magnet, an Alnico magnet, or a bonded magnet. The permanent magnet 46 is a magnetized hard magnetic material and formed, for example, by placing a hard magnetic material not yet having been magnetized on the frame 43 and magnetizing the entire structure. The reason for this is that an attempt to place the permanent magnet 46, which has been magnetized, on the frame 43 may not result in successful placement of the permanent magnet 46 in a desired position in some cases because magnetic fields produced by objects outside the apparatus and other parts in the apparatus affect the placement of the permanent magnet 46.

The coil 47 is disposed immediately below the permanent magnet 46, whereby a magnetic field produced by the coil 47 can act on the permanent magnet 46 in an efficient manner. As a result, the power consumption and the size of the optical scanner 40 can be reduced. The coil 47 is wound around the magnetic core 48. The magnetic field produced by the coil 47 can thus act on the permanent magnet 46 in an efficient manner. The magnetic core 48 may be omitted.

The thus configured coil 47 is electrically connected to the voltage applying section 49. When the voltage applying section 49 applies a voltage to the coil 47, the coil 47 produces a magnetic field having a magnetic perpendicular to the first and second axes J1, J2.

The voltage applying section 49 includes a first voltage generator 491 that generates a first voltage V1 for causing the movable portion 41 to pivot around the first axis J1, a second voltage generator 492 that generates a second voltage V2 for causing the movable portion 41 to pivot around the second axis J2, and a voltage superimposing section 493 that superimposes the first voltage V1 and the second voltage V2 on each other, and the superimposed voltage from the voltage superimposing section 493 is applied to the coil 47, as shown in FIG. 6.

The first voltage V1 (voltage for primary scan), which is generated by the first voltage generator 491, periodically changes at a period T1, as shown in FIG. 7A. The first voltage V1 has a sinusoidal waveform. The frequency of the first voltage V1 (1/T1) is preferably a value ranging, for example, from 10 to 40 kHz. In the present embodiment, the frequency of the first voltage V1 is set to be equal to a torsional resonant frequency (f1) of the first oscillation system formed of the movable portion 41 and the pair of shafts 421 and 422, whereby the angle of pivotal motion of the movable portion 41 around the first axis J1 can be increased.

On the other hand, the second voltage V2 (voltage for secondary scan), which is generated by the second voltage generator 492, periodically changes at a period T2 different from the period T1, as shown in FIG. 7B. The second voltage V2 has a saw-toothed waveform. The frequency of the second voltage V2 (1/T2) only needs to differ from the frequency of the first voltage V1 (1/T1) and is preferably a value ranging, for example, from 30 to 80 Hz (about 60 Hz). In the present embodiment, the frequency of the second voltage V2 is adjusted to be a frequency different from a torsional resonant frequency (resonant frequency) of the second oscillation system formed of the movable portion 41, the pair of shafts 421 and 422, the frame 43, the two pairs of shafts 441, 442, 443, and 444, and the permanent magnet 46.

The thus set frequency of the second voltage V2 is preferably lower than the frequency of the first voltage V1. In this case, the movable portion 41 is allowed to swing not only around the first axis J1 at the frequency of the first voltage V1 but also around the second axis J2 at the frequency of the second voltage V2 in a more reliable, smoother manner.

Now, let f1 [Hz] be the torsional resonant frequency of the first oscillation system and f2 [Hz] be the torsional resonant frequency of the second oscillation system, and f1 and f2 preferably satisfy f2<f1, more preferably 10×f2≤f1. Satisfying the relationship described above allows the movable portion 41 to pivot not only around the first axis J1 at the frequency of the first voltage V1 but also around the second axis J2 at the frequency of the second voltage V2 in a smoother manner. On the other hand, when f1≤f2, the first oscillation system can oscillate at the frequency of the second voltage V2.

The thus configured first voltage generator 491 and second voltage generator 492 are connected to the controller 6 and driven based on signals from the controller 6. The voltage superimposing section 493 is connected to the first voltage generator 491 and the second voltage generator 492.

The voltage superimposing section 493 includes an adder 493a for applying a voltage to the coil 47. The adder 493a receives the first voltage V1 from the first voltage generator 491, receives the second voltage V2 from the second voltage generator 492, superimposes the voltages on each other, and applies the resultant voltage to the coil 47.

A description will next be made of a method for driving the optical scanner 40. It is assumed that the frequency of the first voltage V1 is set to be equal to the torsional resonant frequency of the first oscillation system, and that the frequency of the second voltage V2 is set to be not only different from the torsional resonant frequency of the second oscillation system but also smaller than the frequency of the first voltage V1 (for example, the frequency of the first voltage V1 is set at 15 kHz, and the frequency of the second voltage V2 is set at 60 Hz).

For example, when the voltage superimposing section 493 superimposes the first voltage V1 shown in FIG. 7A and the second voltage V2 shown in FIG. 7B on each other and applies the superimposed voltage to the coil 47, the first voltage V1 produces the following alternately switching magnetic fields: a magnetic field that causes one end (N pole) of the permanent magnet 46 to be attracted to the coil 47 and the other end (S pole) of the permanent magnet 46 to be repulsed from the coil 47 (the magnetic field is referred to as a "magnetic field A1"); and a magnetic field that causes the one end (N pole) of the permanent magnet 46 to be repulsed from the coil 47 and the other end (S pole) of the permanent magnet 46 to be attracted to the coil 47 (the magnetic field is referred to as a "magnetic field A2").

When the magnetic field A1 and the magnetic field A2 are alternately switched from each other as described above, oscillation having a torsional oscillation component around the first axis J1 is excited in the frame 43, and the oscillation causes the shafts 421 and 422 to be torsionally deformed and hence the movable portion 41 to swing around the first axis J1 at the frequency of the first voltage V1. Since the frequency of the first voltage V1 is equal to the torsional resonant frequency of the first oscillation system, the resonant oscillation allows the movable portion 41 to swing at a large amplitude.

On the other hand, the second voltage V2 produces the following alternately switching magnetic fields: a magnetic field that causes the one end (N pole) of the permanent magnet 46 to be attracted to the coil 47 and the other end (S pole) of the permanent magnet 46 to be repulsed from the coil 47 (the magnetic field is referred to as a "magnetic field B1"); and a magnetic field that causes the one end (N pole) of the permanent magnet 46 to be repulsed from the coil 47 and the other end (S pole) of the permanent magnet 46 to be attracted to the coil 47 (the magnetic field is referred to as a "magnetic field B2").

When the magnetic field B1 and the magnetic field B2 are alternately switched from each other as described above, the shafts 441, 442 and the shafts 443, 444 are torsionally deformed and the frame 43 along with the movable portion 41 swings around the second axis J2 at the frequency of the second voltage V2. Since the frequency of the second voltage V2 is set to be much lower than the frequency of the first voltage V1 and the torsional resonant frequency of the second oscillation system is set to be lower than the torsional resonant frequency of the first oscillation system as described above, the pivotal motion of the movable portion 41 around the first axis J1 will not occur at the frequency of the second voltage V2.

As described above, when the first voltage V1 and the second voltage V2 superimposed on each other are applied to the coil 47 in the optical scanner 40, the movable portion 41 can pivot not only around the first axis J1 at the frequency of the first voltage V1 but also around the second axis J2 at the frequency of the second voltage V2. The thus configured optical scanner 40 allows the cost and size of the apparatus to be reduced and causes the movable portion 41 to swing around the first and second axes J1, J2 based on the electromagnetic drive method (moving magnet method), whereby the drawing laser light LL reflected off the light reflection portion 414 can be deflected for two-dimensional scanning. Further, since the number of parts that form the drive source (permanent magnet and coil) can be reduced, the resultant configuration can be simple and compact. Moreover, since the coil 47 is set apart from the oscillation systems of the optical scanner 40, heat generated by the coil 47 will not adversely affect the oscillation systems.

The configuration of the optical scanner 40 has been described above in detail. According to the gimbal-type, two-dimensional-scanning optical scanner 40 described above, which is alone capable of deflecting the drawing laser light LL for two-dimensional scanning, the size of the optical scan section 4 can be reduced and alignment adjustment thereof can be readily made as compared, for example, with a configuration in which two one-dimensional-scanning optical scanners are combined with each other to deflect the drawing laser light LL for two-dimensional scanning.

The optical scanner 40 is an electro-magnetically driven optical scanner driven by using the permanent magnet 46 and the coil 47. The thus configured optical scanner 40 requires the permanent magnet 46 and the coil 47 to face each other as shown in FIG. 5, which increases the thickness of the optical scanner 40 (length in the direction of an axis J3 that intersects the intersection of the first and second axes J1, J2 and is perpendicular to the two axes). However, the size of the optical scanner 40 in the in-plane direction in the plane including the first and second axes J1, J2 can be reduced. As described above, the optical scanner 40, the size of which in the in-plane direction described above is reduced instead of the size in the thickness direction, forms an optical scanner suitable for the image display apparatus 1.

The optical scanner 40 having the configuration described above is disposed in the enclosure 9 so that the light reflection portion 414 is perpendicular to the XY plane when the optical scanner 40 is not driven (when no voltage is applied to the coil 47) as shown in FIGS. 1 and 3. In other words, the optical scanner 40 is disposed in the enclosure 9 so that the plane including the first and second axes J1, J2 is perpendicular to the XY plane (the axis J3 is present in the plane F). Since the optical scanner 40 has a small size in the in-plane direction in the plane including the first and second axes J1, J2 as described above, disposing the optical scanner 40 as described above allows the size (thickness) of the image display apparatus 1 (enclosure 9) to be reduced. Since the optical scanner 40 is not so thin in the direction of the axis J3 but is disposed in the image display apparatus 1 so that the axis J3 is present in the plane F, an increase in the size of the apparatus resulting from the thickness in the direction of the axis J3 is minimized.

Further, the drawing laser light LL having passed through the prism 3 is incident on the light reflection portion 414 in a direction inclined to the axis J3. An angle θ between the axis J3 and the drawing laser light LL incident on the light reflection portion 414 is not limited to a specific value but is preferably greater than or equal to about 30° but smaller than or equal to about 60°.

When the drawing laser light LL is incident on the light reflection portion 414 in a direction inclined to the axis J3 (normal to light reflection surface 414*a*), the drawing laser light LL deflected by the optical scanner 40 for scanning can exit out of the enclosure 9 without interfering with other members (prism 3, for example) in the enclosure 9. It is therefore not necessary to provide a flat mirror, a prism, or any other optical component for changing the optical path of the drawing laser light LL deflected by the optical scanner 40 for scanning, whereby the size of the image display apparatus 1 can be reduced.

Further, in the optical scanner 40, the amplitude of the oscillation (angle of swing motion) of the resonantly driven movable portion 41 around the first axis J1 is greater than the amplitude of the oscillation of the non-resonantly driven movable portion 41 around the second axis J2. The optical scanner 40 is disposed so that the amplitude in the Z-axis direction is greater than the amplitude in the in-plane direction in the XY plane. That is, the optical scanner 40 is disposed so that the first axis J1 (shafts 421 and 422) is parallel to the in-plane direction in the XY plane (coincides with the plane F) and the second axis J2 (shafts 441, 442, 443, and 422) is parallel to the Z axis. Disposing the optical scanner 40 as described above provides the following advantageous effects.

Since the drawing laser light LL is incident on the light reflection portion 414 in a direction inclined to the axis J3 as described above, a drawable region S shaped as shown in FIGS. 8A and 8B is irradiated with the drawing laser light LL deflected by the light reflection portion 414 for two-dimensional scanning. FIG. 8A shows a drawable region available when the optical scanner 40 is disposed so that the first axis J1 is parallel to the in-plane direction in the XY plane and the second axis J2 is parallel to the Z axis as described in the present embodiment. Conversely, FIG. 8B shows a drawable region available when the optical scanner 40 is disposed so that the first axis J1 is parallel to the Z axis and the second axis J2 is parallel to the in-plane direction in the XY plane. As shown in FIGS. 8A and 8B, the distortion of the drawable region S in FIG. 8A is smaller than in FIG. 8B, whereby the drawable region S in FIG. 8A provides a larger effective rectangular drawing region (region actually irradiated with drawing laser light LL for image display) S' ensured in the drawable region S than in FIG. 8B. Therefore, the drawable region S can be used more effectively in FIG. 8A than in FIG. 8B, and a more efficient, larger image can be drawn.

The optical scanner 40 is preferably disposed so that the drawable region shown in FIG. 8A is provided but may alternatively be disposed so that the drawable region shown in FIG. 8B is provided.

1-4. Detector

The detector 5 has a function of detecting the intensity of the drawing laser light LL (each of the laser light RR, GG, and BB). The thus configured detector 5 includes a light receiving device 51, such as a photodiode, disposed in the enclosure 9.

The light incident surface 31 of the prism 3 is configured to slightly (at a reflectance of about 0.1%, for example) reflect the laser light RR, GG, and BB, and the light receiving device 51 is located on the optical paths of the reflected light. The light receiving device 51 outputs a signal (voltage) having a magnitude according to the intensity of each of the received reflected light, and the intensity of each of the laser light RR, GG, and BB can be detected based on the signal.

Information on the detected intensities of the laser light RR, GG, and BB is sent to the controller 6, which then controls the drive operation of the laser light sources 21R, 21G, and 21B based on the received information.

Specifically, the reflectance and transmittance representing how much the collimator lenses 22R, 22G, and 22B and the dichroic mirrors 23R, 23G, and 23B reflect and transmit the laser light RR, GG, and BB and the reflectance representing how much the light incident surface 31 reflects the laser light RR, GG, and BB are measured in advance, and the measurement information is stored in a memory (not shown) in the controller 6.

Subsequently, for example, before image drawing is initiated, the controller 6 sends a drive signal of a predetermined magnitude (voltage) to the drive circuit associated with the laser light source 21R, which then emits the laser light RR. Part of the laser light RR is then reflected off the light incident surface 31 of the prism 3, and the light receiving device 51 receives the reflected light and detects the intensity thereof. The actual intensity of the laser light RR emitted from laser light source 21R is then determined based on the reflectance stored in the memory described above and representing how much each of the portions described above reflects the laser light RR. The relationship between the intensity of the laser light RR and the magnitude (voltage value) of the drive signal is thus determined, and the magnitude of the drive signal necessary to provide the laser light RR of a predetermined intensity is found.

The relationship is stored in the memory described above. To draw an image, the controller 6 sends the drive circuit a desired drive signal, based on the relationship, that causes the laser light source 21R to emit a laser light RR of a desired intensity. The same holds true for the laser light GG and BB. Specifically, the relationship between the intensity of each of the laser light GG and BB and the magnitude of the corresponding drive signal is determined, and the controller 6 sends, based on the determined relationships, the drive circuit desired drive signals that cause the laser light sources 21G and 21B to emit laser light GG and BB of desired intensities.

Drawing laser light LL of a desired color and luminance can thus be produced, and the image display characteristics are improved.

The above description has been made with reference to the case where the relationship between the intensity of the laser light RR and the magnitude (voltage value) of the drive signal is provided before image drawing is initiated. The relationship is not necessarily provided before image drawing is initiated and may, for example, be provided in the course of image drawing. The effective drawing region S' in the drawable region S is irradiated with the drawing laser light LL, whereas the other region (non-drawing region S") is not irradiated therewith, as described above. In view of the fact described above, the relationship between the intensity of the laser light RR and the magnitude (voltage value) of the drive signal may alternatively be provided as described above during a period when an image is being drawn but the movable portion 41 (light reflection portion 414) faces the non-drawing region S" and no drawing laser light LL is outputted.

1-5. Controller

The controller 6 has a function of controlling the operation of the drawing light source unit 2 and the light scan section 4. Specifically, the controller 6 drives the optical scanner 40 to cause the movable portion 41 to swing around the first and second axes J1, J2 and drives the drawing light source unit 2 to output the drawing laser light LL in synchronization with the swing motion of the movable portion 41. The controller 6 drives the laser light sources 21R, 21G, and 21B to emit laser light RR, GG, and BB of predetermined intensities at predetermined timings based, for example, on image data sent from an external computer so that the drawing laser light LL of a predetermined color and intensity (luminance) is outputted at a predetermined timing. As a result, an image according to the image data is displayed on the object 10.

The configuration of the image display apparatus 1 has been described in detail.

In the image display apparatus 1 described above, the members thereof, that is, the laser light sources 21R, 21G, and 21B, the collimator lenses 22R, 22G, and 22B, the dichroic mirrors 23R, 23G, and 23B, the prism 3, the optical scanner 40, and the light receiving device 51 are arranged in a flat plane (the same plane) extending in the direction in which the XY plane extends. The optical axes of the laser light RR, GG, and BB emitted from the laser light sources 21R, 21G, and 21B and the optical axis of the drawing laser light LL, which is the combination of the laser light RR, GG, and BB, are present in the same plane (first plane F) parallel to the XY plane until the laser light RR, GG, and BB or the drawing laser light LL is incident on the optical scanner 40. Further, the light reflection surface 414a is disposed so that it is perpendicular to the plane F. Moreover, in the image display apparatus 1, since the prism 3 inclines the optical axis of the drawing laser light LL within the plane F, the components of the image display apparatus 1 (optical scanner 40, in particular) can be arranged in the flat plane. In this case, the components of the image display apparatus 1 can be aligned with one another in the flat plane, whereby the image display apparatus 1 can be readily assembled. Further, in the image display apparatus 1, since the prism 3 shapes the drawing laser light LL, excellent image display characteristics are provided. Moreover, the number of parts can be reduced, and the size of the apparatus can be reduced accordingly.

2. Heads-Up Display

A description will next be made of the configuration of a heads-up display based on the image display apparatus according to the embodiment of the invention.

Figure 9:
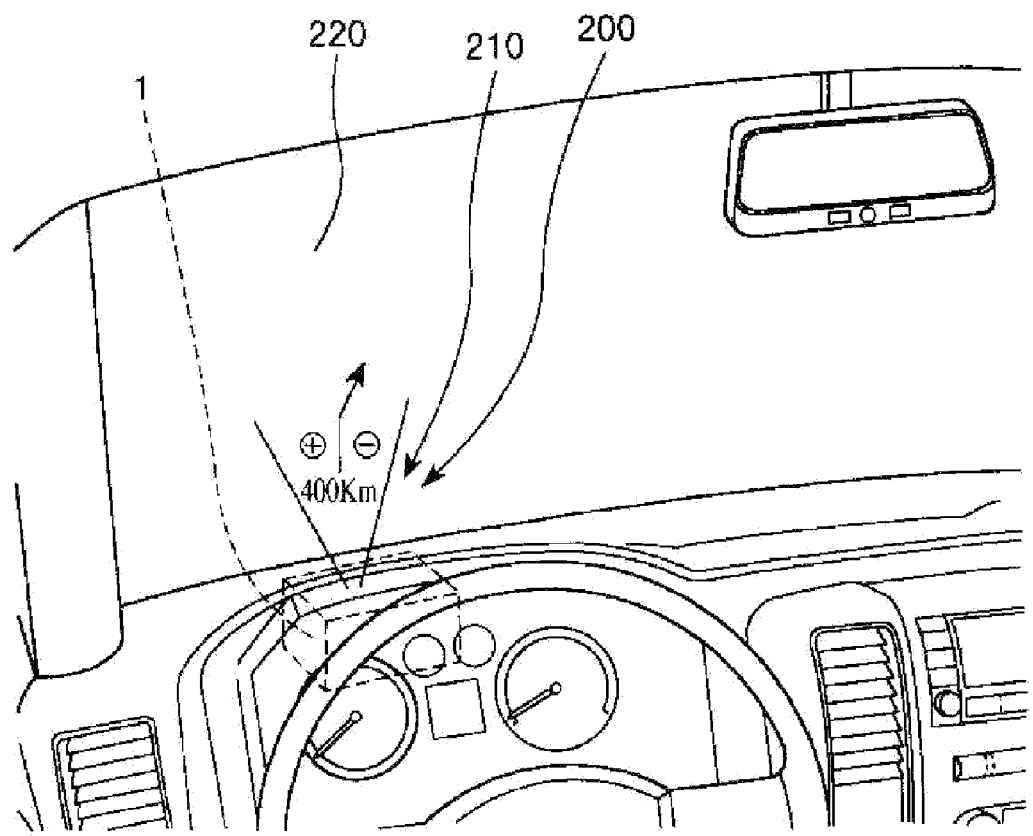
FIG. 9 is a perspective view showing a heads-up display based on the image display apparatus according to the embodiment of the invention.

FIG. 9 is a perspective view showing a heads-up display based on the image display apparatus according to the embodiment of the invention.

In a heads-up display system 200, the image display apparatus 1 is accommodated in a dashboard of an automobile to form a heads-up display 210, as shown in FIG. 9. The heads-up display 210 can display a predetermined image, such as a displayed image that guides a driver to a destination, on a windshield 220. The heads-up display system 200 is not necessarily used with an automobile and may be used, for example, with an airplane and a ship.

3. Head-Mounted Display

A description will next be made of a head-mounted display based on the image display apparatus according to the embodiment of the invention (head-mounted display according to the embodiment of the invention).

Figure 10:
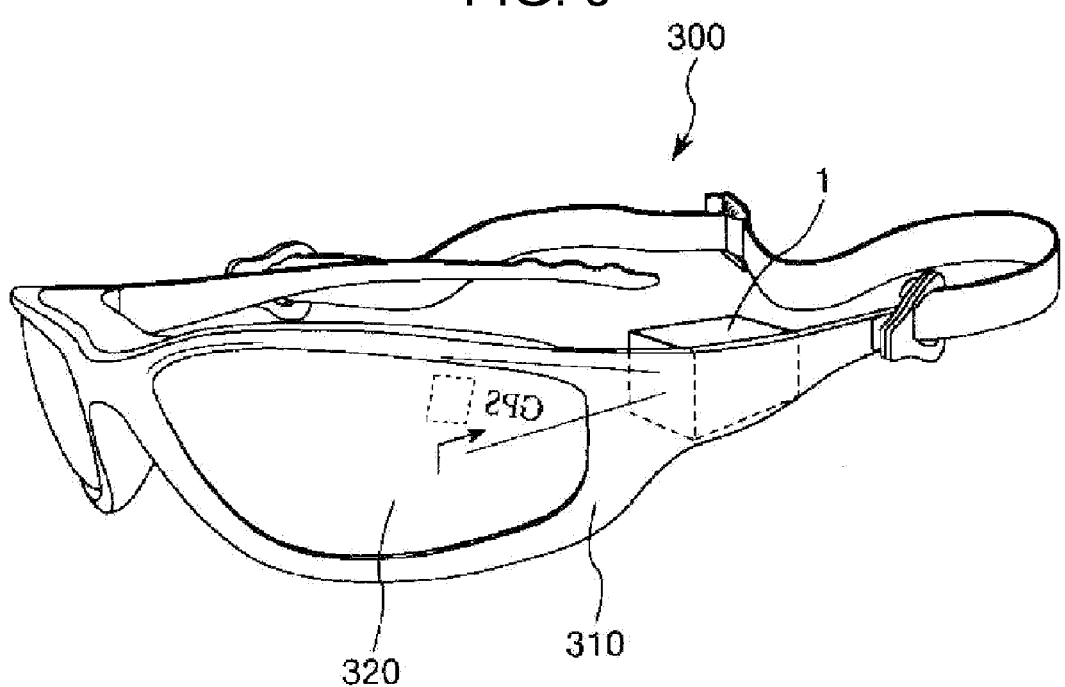
FIG. 10 is a perspective view showing a head-mounted display according to an embodiment of the invention.

FIG. 10 is a perspective view showing a head-mounted display according to the embodiment of the invention.

A head-mounted display 300 includes glasses 310 and the image display apparatus 1 mounted on the glasses 310, as shown in FIG. 10. The image display apparatus 1 displays a predetermined image in a display section (light reflection member) 320 provided in a portion of the glasses 310 that originally functions as a lens, and the image is viewed with one of the eyes.

The display section 320 may be transparent or opaque. When the display section 320 is transparent, information from the image display apparatus 1 can be superimposed on information from the real world and the superimposed information can be viewed. Further, the display section 320 only needs to reflect at least part of light incident thereon and can, for example, be a half-silvered mirror.

The head-mounted display 300 may alternatively be provided with two image display apparatuses 1, and two display sections may display images viewed with both eyes.

The image display apparatus and the head-mounted display according to the embodiments of the invention have been described with reference to the drawings, but the invention is not limited thereto. The configuration of each of the components can be replaced with an arbitrary configuration having the same function. Further, other arbitrary components may be added to the embodiments of the invention.

Further, the above embodiment has been described with reference to the case where the frame of the optical scanner, specifically a lower portion of the frame in FIG. 5, is formed to be thicker than the base of the movable portion and the permanent magnet is fixed to the lower surface of the thus formed frame, but the configuration of the frame is not limited thereto. For example, the frame may be formed so that it has the same thickness as that of the base. In this case, to prevent the base from coming into contact with the permanent magnet fixed to the lower surface of the frame, a recess (clearance) may be formed in the upper surface of the permanent magnet.

The entire disclosure of Japanese Patent Application No. 2012-127449 filed Jun. 4, 2012 is incorporated by reference herein.

What is claimed is:

1. An image display apparatus comprising:
    a plurality of light source sections each of which outputs a light;
    a light combining section that combines the light from the plurality of light source sections; and
    an optical scan section that deflects the combined light from the light combining section for two-dimensional scanning around a first axis and a second axis perpendicular to the first axis,
    wherein an optical axis of the light outputted from each of the plurality of light source sections and directed through the light combining section toward the optical scan section is present in a first plane,
    the optical scan section includes:
        a base that swings around the first axis and the second axis,
        a light reflection plate having a light reflection surface that reflects the light from the light combining section, the light reflection surface having an area larger than an area of the base, and
        a spacer that connects the base and the light reflection plate to each other,
    the first axis is present in the first plane,
    the second axis is parallel to a normal of the first plane, and
    the light reflection surface is perpendicular to the first plane when the optical scan section is not driven.

2. The image display apparatus according to claim 1, wherein the light reflection surface is irradiated with the combined light traveling in a direction inclined to a normal to the light reflection surface.

3. The image display apparatus according to claim 1, wherein an amplitude of the swing motion of the base around the first axis is greater than an amplitude of the swing motion of the base around the second axis.

4. The image display apparatus according to claim 1, wherein the optical scan section includes:
    a frame that surrounds the base,
    a support that supports the frame,
    a first shaft that connects the base to the frame so that the base is rotatable around the first axis relative to the frame, and
    a second shaft that connects the frame to the support so that the frame is rotatable around the second axis relative to the support.

5. The image display apparatus according to claim 4, wherein the light reflection plate is spaced apart from the first shaft in a thickness direction of the light reflection plate but overlaps at least a part of the first shaft when viewed in a thickness direction.

6. The image display apparatus according to claim 4, wherein the first shaft is disposed in parallel to an in-plane direction in the first plane, and
    the base resonantly swings around the first axis by resonantly driving a first oscillation system including the light reflection plate, the spacer, the base, and the first shaft.

7. The image display apparatus according to claim 5, wherein a width of the frame in a direction of the normal to the first plane is smaller than a width of the frame in an in-plane direction in the first plane.

8. The image display apparatus according to claim 5, wherein the optical scan section further includes a permanent magnet provided on the frame and a coil that faces the frame and produces a magnetic field that acts on the permanent magnet.

9. The image display apparatus according to claim 1, further comprising:
    a prism on an optical axis of the combined light from the light combining section, the prism inclining the optical axis of the combined light from the light combining section, and changing a cross-sectional shape of the combined light.

10. The image display apparatus according to claim 9, wherein the light from each of the light source sections is linearly polarized light that behaves as s-polarized light with respect to a light incident surface of the prism.

11. The image display apparatus according to claim 9, wherein the prism increases a width of the cross-sectional shape of the combined light in an in-plane direction in the first plane.

12. The image display apparatus according to claim 9, wherein a light exiting surface of the prism is a light collecting lens surface.

13. The image display apparatus according to claim 1, wherein a radiation angle of the light outputted from each of the plurality of light source sections in the direction of the normal to the first plane is greater than a radiation angle of the outputted light in an in-plane direction in the first plane.

14. The image display apparatus according to claim 2, wherein an amplitude of the swing motion of the base around the first axis is greater than an amplitude of the swing motion of the base around the second axis.

15. The image display apparatus according to claim 5, wherein the first shaft is disposed in parallel to an in-plane direction in the first plane, and the base resonantly swings around the first axis by resonantly driving a first oscillation system including the light reflection plate, the spacer, the base, and the first shaft.

16. The image display apparatus according to claim 6, wherein a width of the frame in the direction of the normal to the first plane is smaller than a width of the frame in the in-plane direction in the first plane.

17. The image display apparatus according to claim 10, wherein the prism increases a width of the cross-sectional shape of the combined light in an in-plane direction in the first plane.

18. The image display apparatus according to claim 10, wherein a light exiting surface of the prism is a light collecting lens surface.

19. The image display apparatus according to claim 11, wherein a light exiting surface of the prism is a light collecting lens surface.

20. A head-mounted display comprising:
a light reflection member that reflects at least part of light incident thereon; and
an image display apparatus that irradiates light to the light reflection member,
the image display apparatus including:
   a plurality of light source sections each of which outputs a light,
   a light combining section that combines the light from the plurality of light source sections, and
   an optical scan section that deflects the combined light from the light combining section for two-dimensional scanning around a first axis and a second axis perpendicular to the first axis,
wherein an optical axis of the light outputted from each of the plurality of light source sections and directed through the light combining section toward the optical scan section is present in a first plane,
the optical scan section includes:
   a base that swings around the first axis and the second axis,
   a light reflection plate having a light reflection surface that reflects the light from the light combining section, the light reflection surface having an area larger than an area of the base, and
   a spacer that connects the base and the light reflection plate to each other,
the first axis is present in the first plane,
the second axis is parallel to a normal of the first plane, and
the light reflection surface is perpendicular to the first plane when the optical scan section is not driven.

21. The image display apparatus according to claim 1, wherein the plurality of light source sections are provided along a predetermined direction, and light emitting directions of the plurality of light source sections are the same.

22. The image display apparatus according to claim 21, further comprising:
a prism provided on an optical axis of the light combined by the light combining section, wherein
the prism inclines the optical axis of the light combined by the light combining section,
the prism is placed on a first extension of the optical axis of the light emitted from one of the plurality of light source sections, and
the optical scan section is placed on a second extensions of the optical axis of the light emitted from the other of the plurality of light source sections.

\* \* \* \* \*